United States Patent
Wakabayashi et al.

(10) Patent No.: US 6,747,921 B2
(45) Date of Patent: *Jun. 8, 2004

(54) APPARATUS FOR DRIVING AN OBJECTIVE LENS UTILIZING FLEXIBLE ARMS AND PIVOTABILITY MECHANISMS

(75) Inventors: Kanji Wakabayashi, Kyoto (JP); Hitoshi Fujii, Hirakata (JP); Hiroshi Yamamoto, Yawata (JP); Masanari Mohri, Kobe (JP); Takayuki Kojima, Osaka (JP); Daisaburo Kubota, Osaka (JP); Kenichiro Urairi, Yawata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/390,129

(22) Filed: Mar. 17, 2003

(65) Prior Publication Data

US 2003/0174596 A1 Sep. 18, 2003

Related U.S. Application Data

(63) Continuation of application No. 09/252,133, filed on Feb. 18, 1999, now abandoned.

(30) Foreign Application Priority Data

Feb. 20, 1998 (JP) .................................... 10-038377

(51) Int. Cl.[7] .............................................. G11B 7/095
(52) U.S. Cl. ................................................ 369/44.16
(58) Field of Search ......................... 369/44.14–44.16, 369/247, 253, 244

(56) References Cited

U.S. PATENT DOCUMENTS 5,488,603 A    1/1996   Tomita et al.
5,541,899 A    7/1996   Kume et al.
5,734,638 A    3/1998   Matsui
5,790,510 A    8/1998   Itoh et al.
5,905,255 A    5/1999   Wakabayashi et al.
5,999,501 A   12/1999   Tomita et al.
6,016,292 A    1/2000   Lee
6,134,058 A   10/2000   Mohri et al.

FOREIGN PATENT DOCUMENTS

JP    04319537 A    11/1992
JP    05266507 A    10/1993

Primary Examiner—W. R. Young
(74) Attorney, Agent, or Firm—Snell & Wilmer, LLP

(57) ABSTRACT

An apparatus for driving an objective lens of the present invention includes: a base which is moved along an optical disk; an objective lens disposed so as to be opposed to the optical disk and having an optical axis in a vertical direction with respect to the optical disk, for optically recording information onto the optical disk or optically reproducing information from the optical disk; a holder portion for holding the objective lens; a plurality of elastic arms extending between the base and the holder portion in a tangent direction of the optical disk, for supporting the holder portion movably with respect to the base; and a driving portion for generating an electromagnetic force for moving the holder portion with respect to the base, wherein the elastic arms are disposed away from each other in a vertical direction, the base includes each movable portion for supporting one end of each of the elastic arms, and each of the movable portions is supported at each position in a vertical direction outside of one end of each of the elastic arms, so as to be elastically pivotable around each axis in a radius direction of the optical disk.

12 Claims, 16 Drawing Sheets

PRIOR ART

PRIOR ART

APPARATUS FOR DRIVING AN OBJECTIVE LENS UTILIZING FLEXIBLE ARMS AND PIVOTABILITY MECHANISMS

This application is a Continuation of U.S. application Ser. No. 09/252,133 filed Feb. 18, 1999, now abandoned.

BACKGROUND OF THE INVENTION

1. Field of the Invention

The present invention relates to an apparatus for driving an objective lens used in an optical head for optically recording information onto an optical disk and optically reading information therefrom, and particularly to an apparatus for driving an objective lens for inputting and outputting light with respect to the optical head.

2. Description of the Related Art

In an optical head for recording and reproducing information with respect to an optical disk such as a compact disk, an objective lens for inputting and outputting light is disposed so as to be opposed to an optical disk, and the objective lens is moved in a radius direction of the optical disk by an actuator, whereby a track on the optical disk is traced.

Furthermore, in order to regulate a focus position of the objective lens by moving the objective lens upward and downward in accordance with the up and down movement of the optical disk surface caused by warpage thereof, to correct a tracking shift of the objective lens caused by eccentricity of the optical disk, and to regulate a relative tilt angle between the optical disk and the objective lens, the objective lens is moved by an apparatus for driving an objective lens.

In the apparatus for driving an objective lens, the objective lens is moved in three directions: a vertical direction (focusing direction) of the optical disk, a radius direction (tracking direction) of the optical disk, and a tangent direction of the optical disk, thereby enabling the optical head to exactly trace a track on the optical disk.

A conventional apparatus for driving an objective lens is described in, for example, Japanese Laid-Open Publication No. 4-319537. FIG. 12 is a schematic view thereof. In this figure, an objective lens 101 is held by a lens holder 102, and the lens holder 102 is connected to an elastic supporting plate 103 via four wires 104. The lens holder 102 is elastically supported by the elastic supporting plate 103 by using each wire 104, so that the lens holder 102 can be moved in any of a focusing direction F, a tracking direction T, and a tangent direction K of an optical disk with respect to the elastic supporting plate 103.

A pair of electromagnetic coils 106a and 106b are provided on a base 105. The elastic supporting plate 103 is fixed to the base 105, and the lens holder 102 is disposed between the electromagnetic coils 106a and 106b. By appropriately regulating an electromagnetic force of the electromagnetic coils 106a and 106b, the lens holder 102 is moved in the focusing direction F, the tracking direction T, and the tangent direction K of an optical disk.

A pair of slits 103a are formed in the elastic supporting plate 103, thereby providing a pair of supporting portions 103b. Resonance of each wire 104 is suppressed by an elastic force of the supporting portions 103b.

In recent years, there has been a demand for a thinner apparatus for driving an objective lens of the abovementioned type, capable of stably positioning an objective lens with high precision. In order to satisfy such a demand, an apparatus for driving an objective lens has been variously modified and developed. The process thereof will be described below.

As shown in FIG. 13, a basic structure of an apparatus 200 for driving an objective lens of the above-mentioned type includes a lens holder 202 for holding an objective lens 201, a base 203, and a plurality of wires 204 connecting the lens holder 202 to the base 203. A light beam 205 passes through the objective lens 201 and is reflected by a prism 206 to be input and output between an optical head (not shown) and an optical disk (not shown). In this structure, the height of the apparatus 200 for driving an objective lens is added to the height of the prism 206, so that the optical head becomes bulky, which is not preferable.

Therefore, in an apparatus 300 for driving an objective lens shown in FIG. 14, considering that the height of a lens holder 302 is larger than a distance between the respective wires 304 at a connected portion between the lens holder 302 and each wire 304, an objective lens 301 is disposed away from the connected portion so as to make the lens holder 302 thinner at a portion of the objective lens 301, and a prism 306 is disposed at a portion where the lens holder 302 is thinner. Thus, the optical head is made thinner.

In the structure shown in FIG. 14, the objective lens 301 is disposed away from the connected portion between the lens holder 302 and each wire 304. Therefore, when resonance occurs in each wire 304, a vibration amplitude of the objective lens 301 which is disposed away from the connected portion becomes large, degrading displacement frequency characteristics of the apparatus for driving an objective lens. Furthermore, resonance around an axis in the tracking direction T (i.e., resonance in a direction represented by an arrow A) occurs in the vicinity of a cutoff frequency of a gain of a servo driving system which moves the objective lens 301 in the focusing direction F. This makes focus control by the servo driving system unstable.

Furthermore, in the case where the objective lens 301 is moved in a radial tilt direction which is a direction around an axis in the tangent direction K of an optical disk, as well as the focusing direction F and the tracking direction T, each wire 304 is greatly twisted. Therefore, unnecessary resonance is likely to occur, further degrading the displacement frequency characteristics of the objective lens 301. Furthermore, a diameter, a length, and the like of each wire 304 are not determined so as to suppress unnecessary resonance of each wire 304, but determined by a lower order resonance frequency of an apparatus for driving an objective lens. Therefore, an unnecessary resonance frequency of each wire 304 cannot be shifted by changing the diameter, length, and the like of each wire 304.

Thus, in an apparatus 400 for driving an objective lens shown in FIG. 15, an elastic supporting portion 406 is provided on a base 403, and one end of each wire 404 is fixed to the elastic supporting portion 406, whereby vibration of the elastic supporting portion 406 is further suppressed by a damping member (not shown). In this structure, a resonance frequency of each wire 404 is shifted by the elastic supporting portion 406, whereby a resonance amplitude of each wire 404 is decreased. Because of this, the displacement frequency characteristics of an objective lens 401 are enhanced. Furthermore, a resonance frequency of each wire 404 can be removed from the vicinity of a cutoff frequency of a gain of a servo driving system which moves the objective lens 401 in the focusing direction F, without affecting a lower order resonance frequency of the apparatus 400 for driving an objective lens, whereby focus control by the servo driving system can be made stable.

However, in the apparatus 400 for driving an objective lens shown in FIG. 15, a printed substrate made of synthetic resin is used for the elastic supporting portion 406 in order to improve the ease of assembly. The printed substrate's characteristics (e.g., coefficient of elasticity) change remarkably depending upon temperature and time. Therefore, a resonance frequency, a resonance amplitude, and the like of each wire 404 cannot be made stable.

Furthermore, in the case where a distance between the respective wires 404 is decreased in the focusing direction F so as to make the apparatus 400 for driving an objective lens thinner, a tilt of an optical axis of the objective lens 401 when the objective lens 401 is moved is increased for the following reason. When a distance between the respective wires 404 is decreased in the focusing direction F, a radius of a path of the objective lens 401 when the objective lens 401 is moved in the focusing direction F becomes smaller, as a result of which a tilt becomes too large to be negligible. Furthermore, the elastic supporting portion 406 may move in the tangent direction K along with deformation of each wire 404. In this case, a tilt is further increased.

The occurrence of such a tilt will be described with reference to FIGS. 16 to 18. Under the situation shown in FIG. 16, the objective lens 401 stays at an initial position, and each wire 404 and the elastic supporting portion 406 are not deformed.

In the case where the objective lens 401 is moved upward in the focusing direction F, as shown in FIG. 17, a movement path of a lens holder 402 has a generally elliptical shape, and a tilt occurs in the objective lens 401. As described above, as a distance between the respective wires 404 becomes smaller, a radius of a movement path of the lens holder 402 becomes smaller and a tilt becomes larger. The lens holder 402 tilts in the direction represented by an arrow N5 with the movement of the lens holder 402. At this time, forces in directions represented by arrows P5 and P6 occur in each wire 404, and the elastic supporting portion 406 pivots in the direction represented by an arrow M5 with respect to a pivot axis S by the forces in the directions represented by the arrows P5 and P6. As a result, the lens holder 402 further tilts in the direction represented by an arrow N6, so that a tilt is further increased.

In the case where the objective lens 401 is moved downward in the focusing direction F as shown in FIG. 18, the lens holder 402 also tilts in the direction represented by an arrow N7 with the movement of the lens holder 402, in the same way as shown in FIG. 17. At this time, forces in directions represented by arrows P7 and P8 occur in each wire 404, and the elastic supporting portion 406 pivots in the direction represented by an arrow M6 with respect to the pivot axis S by the forces in the directions represented by the arrows P7 and P8. As a result, the lens holder 402 further tilts in the direction represented by an arrow N8, so that a tilt is further increased.

When a tilt is increased as described above, optical aberration on a recording surface of an optical disk is increased; as a result, a signal to be recorded onto the optical disk and a signal to be reproduced therefrom are remarkably degraded.

SUMMARY OF THE INVENTION

An apparatus for driving an objective lens of the present invention, includes: a base which is moved along an optical disk: an objective lens disposed so as to be opposed to the optical disk and having an optical axis in a vertical direction with respect to the optical disk, for optically recording information onto the optical disk or optically reproducing information from the optical disk; a holder portion for holding the objective lens; a plurality of elastic arms extending between the base and the holder portion in a tangent direction of the optical disk, for supporting the holder portion movably with respect to the base; and a driving portion for generating an electromagnetic force for moving the holder portion with respect to the base, wherein the elastic arms are disposed away from each other in a vertical direction, the base includes each movable portion for supporting one end of each of the elastic arms, and each of the movable portions is supported at each position in a vertical direction outside of one end of each of the elastic arms, so as to be elastically pivotable around each axis in a radius direction of the optical disk.

In one embodiment of the present invention, each of the movable portions of the base includes a damping member for suppressing vibration of each of the movable portions.

In another embodiment of the present invention, the base includes an elastic plate, the elastic plate is bent at each position in a vertical direction outside of one end of each of the elastic arms, and each of the movable portions of the base is supported so as to be elastically pivotable around each corner of the bent elastic plate.

In another embodiment of the present invention, each axis of the movable portions in a radius direction of the optical disk is elastically movable in a tangent direction of the optical disk.

In another embodiment of the present invention, each of the elastic arms is in the shape of a bar.

In another embodiment of the present invention, the base includes an elastic plate made of metal having each of the movable portions of the base, a stationary section made of metal, and a resinous holding portion for holding the elastic plate, and the holding portion is integrated with the elastic plate and the stationary section by molding.

In another embodiment of the present invention, the base includes an elastic plate made of metal having each of the movable portions of the base, each of the elastic arms is made of metal and soldered to each of the movable portions of the elastic plate, and a reverse surface of each of the movable portions of the elastic plate to which each of the elastic arms is connected is surface-treated for the purpose of decreasing solder wettability.

In another embodiment of the present invention, the surface treatment for the purpose of decreasing solder wettability is Ni-plating.

In another embodiment of the present invention, the base includes an elastic plate made of metal having each of the movable portions of the base, each of the elastic arms is made of metal and soldered to each of the movable portions of the elastic plate, and each of the movable portions of the elastic plate to which each of the elastic arms is connected is surface-treated for the purpose of increasing solder wettability.

In another embodiment of the present invention, the surface treatment for the purpose of increasing solder wettability is Au-plating.

In another embodiment of the present invention, the base includes an elastic plate made of metal having each of the movable portions of the base, a stationary section made of metal, and a resinous holding portion for holding the elastic plate, the holding portion is integrated with the elastic plate by molding, and the elastic plate is soldered to the stationary section.

In another embodiment of the present invention, each of the movable portions of the base is made of synthetic resin integrally molded with at least part of the base.

Thus, the invention described herein makes possible the advantage of providing an apparatus for driving an objective lens which is adapted for a thin type apparatus, and is capable of realizing stable displacement frequency characteristics by suppressing resonance, preventing a tilt of an objective lens from increasing with the movement in a focusing direction and even canceling a tilt of the objective lens at all times.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative embodiments with reference to the attached drawings.

Embodiment 1

Figure 1:
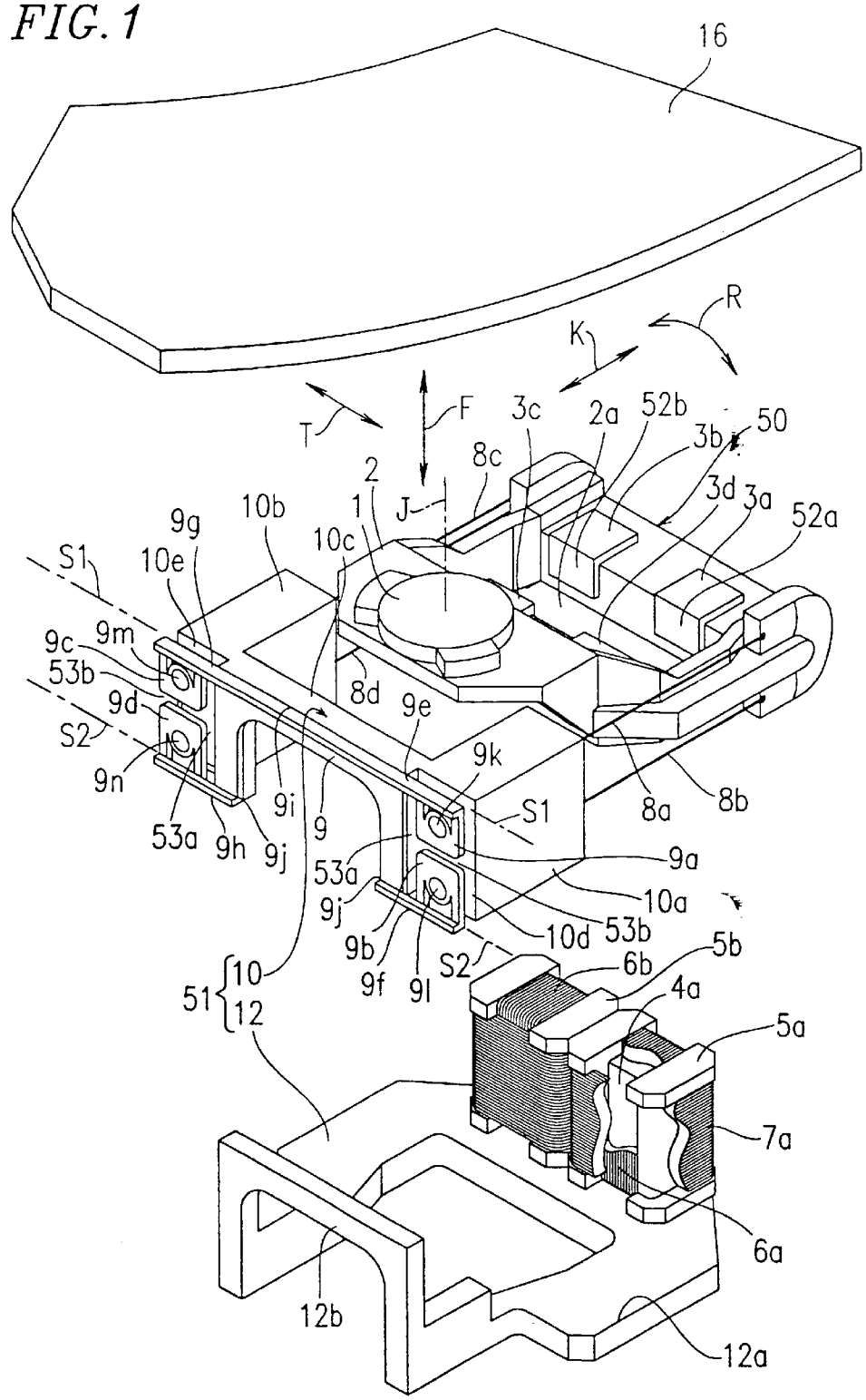
FIG. 1 is an exploded perspective view of an apparatus for driving an objective lens in Embodiment 1 of the present invention.
Figure 2:
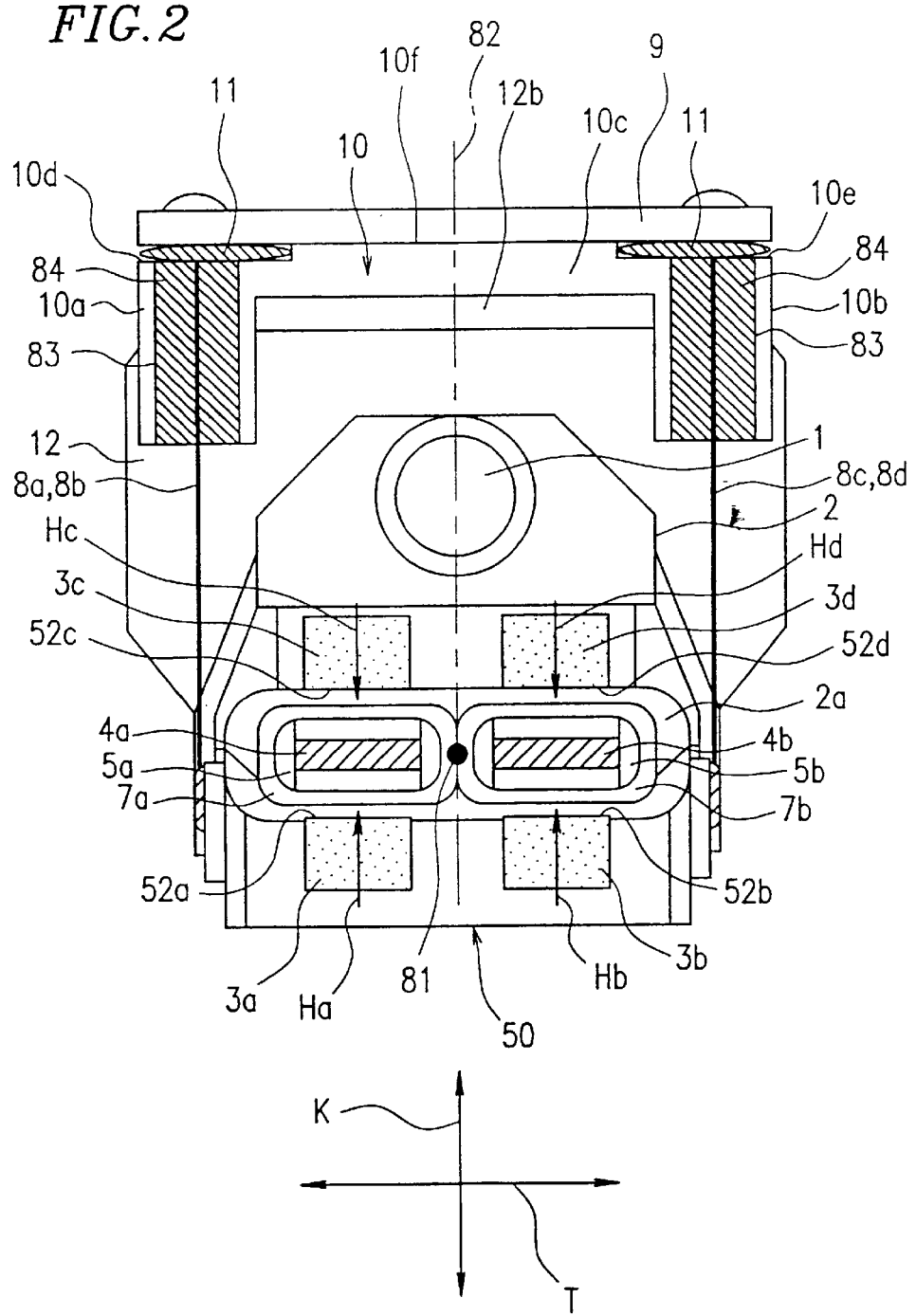
FIG. 2 is a plan view of the apparatus for driving an objective lens shown in FIG. 1 seen from above.

FIG. 1 is an exploded perspective view showing an apparatus for driving an objective lens in Embodiment 1 of the present invention. FIG. 2 is a plan view of the apparatus for driving an objective lens shown in FIG. 1. FIGS. 1 and 2 respectively show a state where an objective lens is not moved.

In FIGS. 1 and 2, it is assumed that a vertical direction of an optical disk 16 is a focusing direction F, and a radius direction of the optical disk 16 is a tracking direction T. In addition, a tangent direction K and a tilt direction R of the optical disk 16 are determined. The focusing direction F, the tracking direction T, and the tangent direction K are orthogonal to each other, and correspond to directions of respective coordinate axes in a three-dimensional rectangular coordinates.

A substantially rectangular window portion 2a is formed at the center of a lens holder 2 made of synthetic resin, and the long sides and short sides of the window portion 2a are positioned in the tracking direction T and the tangent direction K, respectively. An objective lens 1 is disposed on the lens holder 2 slightly away from the window portion 2a. An optical axis J of the objective lens 1 is positioned in the focusing direction F. First to fourth permanent magnets 3a to 3d are disposed along two long sides of the window portion 2a.

The lens holder 2, the objective lens 1, and the first to fourth permanent magnets 3a to 3d form a movable body 50. The objective lens 1 and the permanent magnets 3a to 3d are disposed so as to be symmetric with respect to a symmetric plane 82 which passes through a center of gravity 81 of the movable body 50 and is parallel to the focusing direction F and the tangent direction K. Pole-faces 52a to 52d of the first to fourth permanent magnets 3a to 3d are directed in the tangent direction K. Magnetization directions Ha and Hb of the first and second permanent magnets 3a and 3b are identical, and magnetization directions Hc and Hd of the third and fourth permanent magnets 3c and 3d are identical. The magnetization direction Ha is opposed to the magnetization direction Hc, and the magnetization direction Hb is opposed to the magnetization direction Hd. An acting point of magnetic force of the first to fourth permanent magnets 3a to 3d is designed so as to agree with the center of the movable body 50, and the center of the movable body 50 is designed so as to substantially agree with the center of gravity 81 of the movable body 50.

A holding member 10 is made of transparent synthetic resin, and includes a connecting portion 10c which is reverse U-shaped, seen in the tangent direction K, and two viscoelastic accommodating portions 10a and 10b having a rectangular solid shape, extending from both ends of the connecting portion 10c in the tangent direction K. Stepped concave portions 10d and 10e with a predetermined width and a predetermined depth are formed on both ends of an end surface 10f of the holding member 10.

In the viscoelastic accommodating portions 10a and 10b, four (in total) cylindrical viscoelastic accommodating holes 83 are formed in the tangent direction K. Each of wires 8a to 8d passes through each of viscoelastic accommodating holes 83. Furthermore, a metal supporting plate 9 covering the end surface 10f and the respective stepped concave portions 10d and 10e is fixed to the end surface 10f of the holding member 10. The metal supporting plate 9 (elastic supporting plate) is made of an elastic metal material such as phosphor bronze. The stepped concave portions 10d and 10e of the metal supporting plate 9 respectively include a slit 53a in the focusing direction F and a slit 53b in the tracking direction T, whereby the metal supporting plate 9 has four movable portions 9a to 9d. Upper and lower ends of the metal supporting plate 9 are bent to form bent portions 9i and 9j. The respective movable portions 9a and 9c have a pivot axis in the vicinity of the bent portion 9i, and are elastically displaceable in the tangent direction K so as to pivot around a pivot axis S1. Similarly, the respective movable portions 9b and 9d have a pivot axis S2 in the vicinity of the bent portion 9j, and are elastically displaceable in the tangent direction K so as to pivot around the pivot axis S2. When the movable portions 9a to 9d are independently displaced in the tangent direction K, twist deformation portions 9e to 9h are elastically twisted.

Four wires 8a to 8d are attached to the respective movable portions 9a to 9d of the metal supporting plate 9 and to both sides of the lens holder 2. One end of the respective wires 8a to 8d is soldered to junction points 9k to 9n of the respective movable portions 9a to 9d. The other end of the respective wires 8a to 8d is soldered to both sides of the lens holder 2. Thus, the wires 8a to 8d are stretched in parallel to each other in the tangent direction K. The wires 8a to 8d support the lens holder 2 so as to move it with respect to the metal supporting plate 9.

A supporting point for the wires 8a to 8d to support the movable body 50 substantially agrees with the center of gravity 81 of the movable body 50. Furthermore, the wires 8a to 8d are made of an elastic metal material such as phosphor bronze, and made of line material, bar material, or the like having a circular, substantially polygonal, rectangular, or oval cross-section.

Each of the wires 8a to 8d passes through each of the viscoelastic accommodating holes 83. Each of the viscoelastic accommodating holes 83 is filled with a viscoelastic material 84 for wires. Each of the wires 8a to 8d contacts the viscoelastic material 84 in each of the viscoelastic accommodating holes 83.

A viscoelastic material 11 for a metal supporting plate (damping member) is provided between each of the movable portions 9a, 9b and the stepped concave portion 10d and between each of the movable portions 9c, 9d and the stepped concave portion 10e. Each of the movable portions 9a to 9d contacts the viscoelastic material 11 for a metal supporting plate.

A stationary section 12 is made of metal, and includes a frame body portion 12a and a junction portion 12b which stands at one end of the frame body portion 12a. The junction portion 12b is inserted into a rectangular hole of the holding member 10, i.e., inside a rectangular hole formed of the connecting portion 10c and each of the viscoelastic accommodating portions 10a and 10b. The holding member 10 is molded by insert molding, and integrated with the stationary section 12 and the metal supporting plate 9 during molding. This brings the junction portion 12b of the stationary section 12 into contact with an inner peripheral surface of the rectangular hole formed of the connecting portion 10c and each of the viscoelastic accommodating portion 10a and 10b.

A base 51 is composed of the stationary section 12 and the holding member 10. Thus, the movable body 50 is supported by four wires 8a to 8d in such a manner as to be elastically movable in the focusing direction F and the tracking direction T with respect to the base 51, and is supported so as to rotate in the tilt direction R with respect to the center of gravity 81 of the movable body 50. Furthermore, four wires 8a to 8d are supported by the movable portions 9a to 9d of the metal supporting plate 9 so as to be displaced in the tangent direction K with respect to the base 51.

Furthermore, a first bobbin 5a and a second bobbin 5b are disposed on the frame body portion 12a of the stationary section 12. Under the condition that the holding member 10, the stationary section 12, and the metal supporting plate 9 are integrated, and the movable body 50 is supported by each of the wires 8a to 8d, the first bobbin 5a and the second bobbin 5b are arranged in the window portion 2a of the lens holder 2 in the tracking direction T.

FIG. 2 shows a cross-sectional view of the first bobbin 5a and the second bobbin 5b, and a plan view of the holding member 10.

The first and second bobbins 5a and 5b are molded by resin molding, and integrated with each of opposing yokes 4a and 4b made of a flat magnetic material during molding. Each of tracking coils 6a and 6b is wound around an axis in the tracking direction T. Furthermore, each of focusing coils 7a and 7b is wound around an axis in the focusing direction F on the periphery of each of the tracking coils 6a and 6b.

The first bobbin 5a and the second bobbin 5b are disposed so as to be symmetric with the symmetric plane 82 of the movable body 50 under the condition that the movable body is not moved. More specifically, the first permanent magnet 3a and the third permanent magnet 3c are disposed in such a manner that each of the pole-faces 52a and 52c are opposed to the opposing yoke 4a of the first bobbin 5a, and the second permanent magnet 3b and the fourth permanent magnet 3d are disposed in such a manner that each of the pole-faces 52b and 52d are opposed to the opposing yoke 4b of the second bobbin 5b.

Figure 3A:
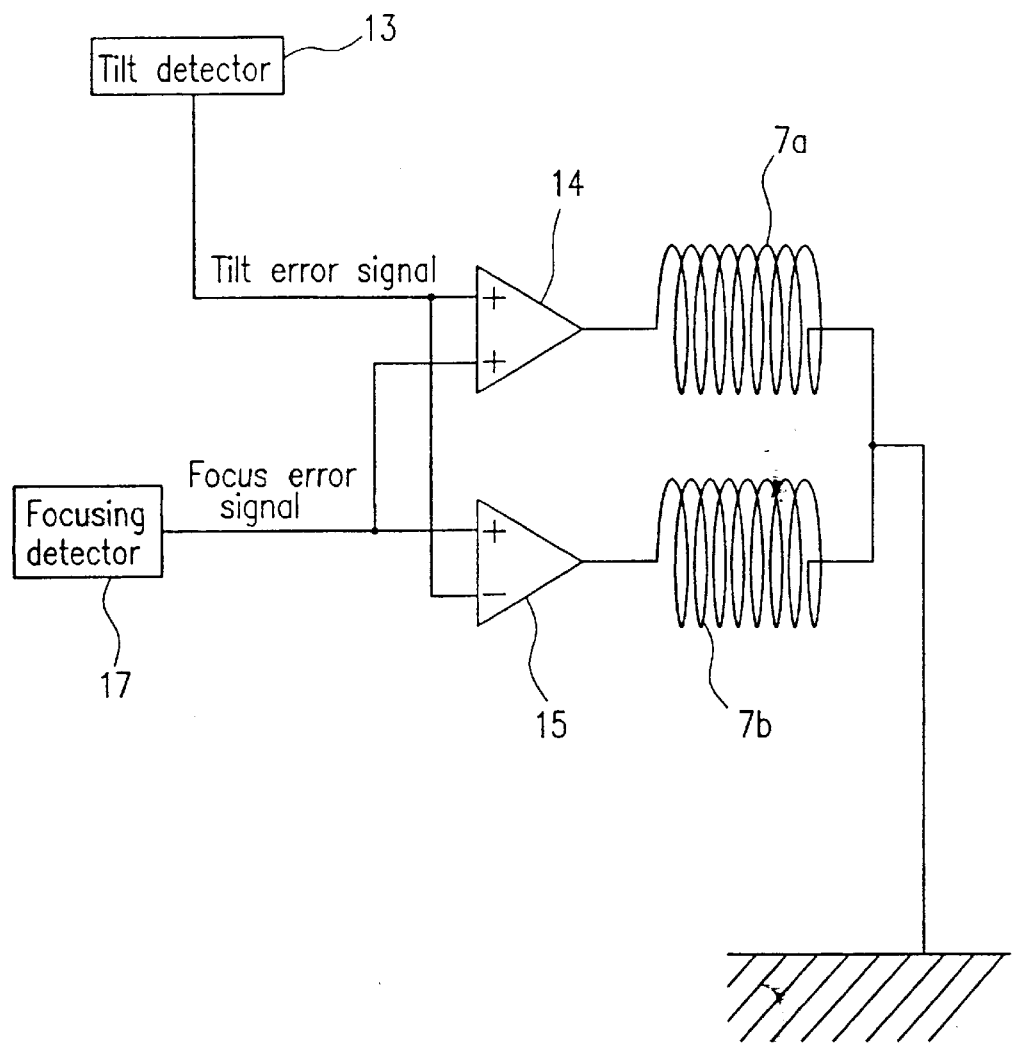
FIG. 3A is a block diagram showing a driving circuit for moving a movable body in the apparatus for driving an objective lens shown in FIG. 1 in a focusing direction F and a tilt direction R.

FIG. 3A is a block diagram showing a driving circuit for moving the movable body 50 in the focusing direction F and the tilt direction R.

In FIG. 3A, a tilt detector 13 detects a relative angle error between the optical disk 16 and the optical axis of the objective lens 1 to output a tilt error signal representing the relative angle error. A focusing detector 17 detects a distance error between the optical disk 16 and the objective lens 1 to output a focus error signal representing the distance error. An adder 14 adds the focus error signal to the tilt error signal to obtain a sum, and supplies a signal representing the sum to the focusing coil 7a of the first bobbin 5a. A subtractor 15 subtracts the tilt error signal from the focus error signal to obtain a difference, and supplies a signal representing the difference to the focusing coil 7b of the second bobbin 5b. The tilt detector 13, the focusing detector 17, the adder 14, and the subtractor 15 are accommodated in an optical unit (not shown) provided under the stationary section 12 shown in FIG. 1. The tilt detector 13 does not necessarily directly detect a relative angle error between the optical disk 16 and the objective lens 1, and may detect a value related to a tilt amount and generate a tilt error signal based on the value. For example, the tilt detector 13 detects a jitter value of a reproduction signal read and reproduced from the optical disk 16, and outputs a signal at which the detected jitter value becomes minimum as a tilt error signal. In the case where tilt detection is conducted based on a jitter value, it is not required that a sensor is provided in the movable body 50 and supplied with power through each of the wires 8a to 8d, so that the metal supporting plate 9 can be formed in a desired shape.

Figure 3B:
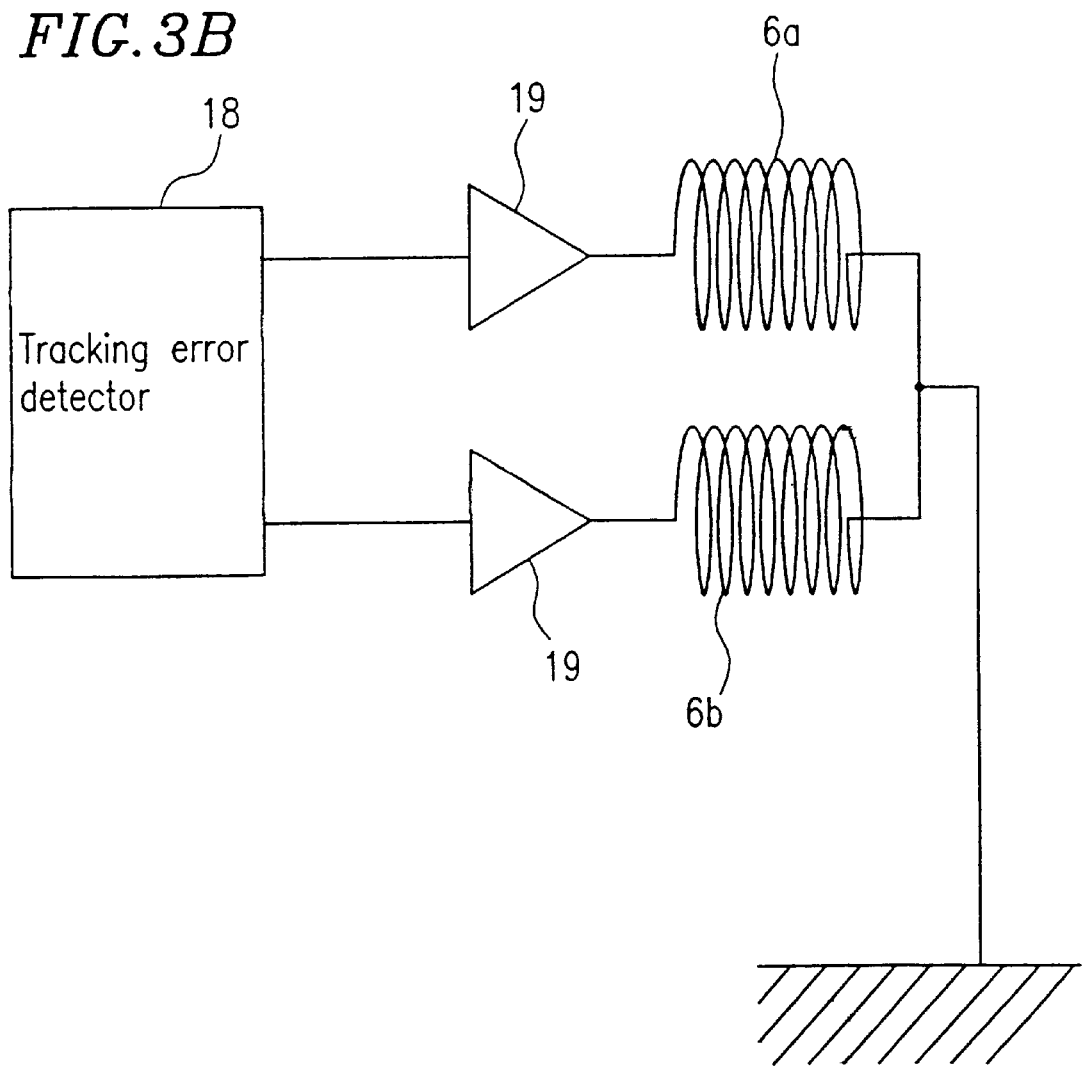
FIG. 3B is a block diagram showing a driving circuit for moving the movable body in the apparatus for driving an objective lens shown in FIG. 1 in a tracking direction T.

FIG. 3B is a block diagram showing a driving circuit for moving the movable body 50 in the tracking direction T.

In FIG. 3B, a tracking error detector 18 detects a tracking error when a track of the optical disk 16 is traced by an optical head to which the apparatus for driving an objective lens in Embodiment 1 is applied, and outputs a tracking error signal representing the tracking error. The tracking error signal is supplied to the tracking coils 6a and 6b of the first and second bobbins 5a and 5b through each of amplifiers 19.

Next, an operation of the apparatus for driving an objective lens will be described.

First, an operation of the movable body 50 in the focusing direction F will be described with reference to FIGS. 1, 3A, and 3B. Herein, it is assumed that a tilt does not occur.

When a focusing error signal is output from the focusing detector 17, the adder 14 and the subtractor 15 add the focusing error signal to the focusing coils 7a and 7b of the first and second bobbins 5a and 5b, respectively. Then, an electromagnetic force in the focusing direction F occurs between the opposing yokes 4a and 4b of the first and second bobbins 5a and 5b, and the first to fourth permanent magnets 3a to 3d. The first to fourth permanent magnets 3a to 3d receive the generated electromagnetic force, and the movable body 50 is substantially translated in the focusing direction F.

Next, an operation of the movable body 50 in the tracking direction T will be described.

When a tracking error signal is output from the tracking error detector 18, the tracking error signal is supplied to the tracking coils 6a and 6b of the first and second bobbins 5a and 5b. Then, an electromagnetic force in the tracking direction T occurs between the opposing yokes 4a and 4b of the first and second bobbins 5a and 5b, and the first to fourth permanent magnets 3a to 3d. The first to fourth permanent magnets 3a to 3d receive the generated electromagnetic force, and the movable body 50 is substantially translated in the tracking direction T.

Next, an operation of the movable body 50 in the radial tilt direction will be described.

When a relative angle error is generated between the optical disk 16 and the optical axis J of the objective lens 1, the tilt detector 13 outputs a tilt error signal in accordance with the relative angle error. The adder 14 receives the tilt error signal, adds the tilt error signal to a focus error signal to obtain a sum, and inputs a signal representing the sum to the focusing coil 7a of the first bobbin 5a. On the other hand, the subtractor 15 receives the tilt error signal, subtracts the tilt error signal from a focus error signal to obtain a difference, and inputs a signal representing the difference to the focusing coil 7b of the second bobbin 5b. Because of this, a difference in accordance with the tilt error signal occurs between the electromagnetic force in the focusing direction F generated by the focusing coil 7a of the first bobbin 5a and the electromagnetic force in the focusing direction F generated by the focusing coil 7b of the second bobbin 5b. Due to the electromagnetic force of the difference, a moment in accordance with the tilt error signal acts between the first permanent magnet 3a and the second permanent magnet 3b. The moment causes the movable body 50 to rotate in the tilt direction R with respect to the center of gravity 81, which corrects an angle shift between the optical disk 16 and the optical axis J of the objective lens 1. In Embodiment 1, since a tilt error signal is generated based on a jitter value, a tilt is corrected based on the tilt error signal as described above; as a result, degradation of jitter caused by a tilt can be sufficiently eliminated.

Next, a function of the metal supporting plate 9 will be described with reference to FIGS. 1 and 2.

Each of the movable portions 9a to 9d of the metal supporting plate 9 supporting one end of each of the wires 8a to 8d is elastically deformable in a longitudinal direction (tangent direction K) of each of the wires 8a to 8d. Thus, a spring constant in the longitudinal direction of each of the wires 8a to 8d becomes equal to that of a spring obtained by directly connecting each of the movable portions 9a to 9d of the metal supporting plate 9 and each of the wires 8a to 8d. Thus, a spring structure, which is different from that having a lower order resonance frequency, only consisting of each of the wires 8a to 8d, can be obtained. Therefore, irrespective of a lower order resonance frequency of the apparatus for driving an objective lens, an unnecessary resonance frequency can be shifted in the longitudinal direction of each of the wires 8a to 8d. Furthermore, the viscoelastic material 11 for a metal supporting plate which contacts each of the movable portions 9a to 9d of the metal supporting plate 9 tries to be deformed in a stretched direction or a compression direction. Therefore, a resonance suppressing effect with a high attenuation factor can be obtained. Furthermore, since the metal supporting plate 9 is made of metal, characteristics thereof will not degrade with the ambient temperature and time.

Furthermore, an operation of the metal supporting plate 9 when the movable body 50 is moved in the focusing direction F will be described with reference to FIGS. 4, 5, and 6.

Figure 4:
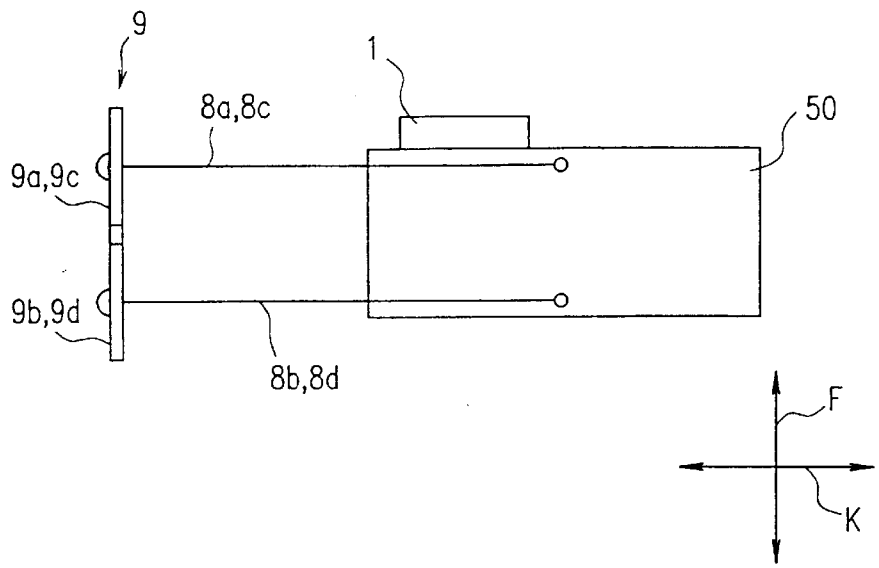
FIG. 4 is a side view schematically showing a state where the movable body in the apparatus for driving an objective lens shown in FIG. 1 is at an initial position.

FIG. 4 is a side view schematically showing a state where the movable body 50 in the apparatus for driving an objective lens shown in FIG. 1 is at an initial position. FIG. 5 is a side view schematically showing a state where the movable body 50 is moved upward in the focusing direction F. FIG. 6 is a side view schematically showing a state where the movable body 50 in the apparatus for driving an objective lens shown in FIG. 1 is moved downward in the focusing direction F. In these figures, only the objective lens 1, the movable body 50, the wires 8a to 8d, and the metal supporting plate 9 are shown.

Figure 5:
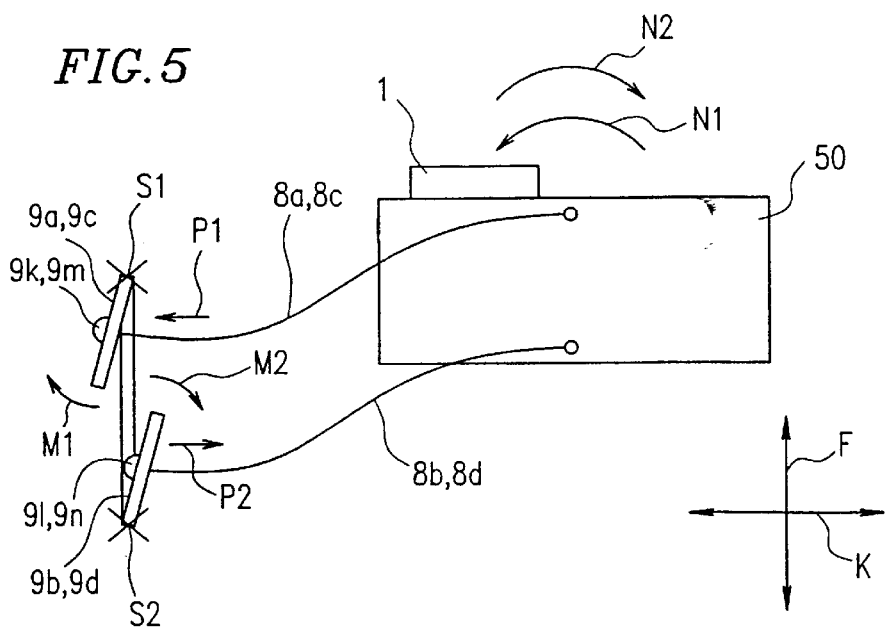
FIG. 5 is a side view schematically showing a state where the movable body in the apparatus for driving an objective lens shown in FIG. 1 is moved upward in the focusing direction F.

First, in the case where the movable body 50 is moved upward in the focusing direction F from the initial position, as shown in FIG. 5, a movement path of the movable body 50 is substantially an ellipse. As a pitch of each of the wires 8a and 8b (or 8c and 8d) provided in the focusing direction F becomes smaller, a radius of the ellipse becomes smaller. Along with the upward movement of the movable body 50 in the focusing direction F, the movable body 50 tries to tilt in a direction represented by an arrow N1 along the movement path of the ellipse, and forces in directions represented by arrows P1 and P2 act on each of the wires 8a and 8b (or 8c and 8d). Therefore, the movable portions 9a and 9c of the metal supporting plate 9 pivot in the direction represented by an arrow M1 with respect to a pivot axis S1 by the force in a direction represented by the arrow P1, and the movable portions 9b and 9d of the metal supporting plate 9 pivot in a direction represented by an arrow M2 with respect to a pivot axis S2 by the force in the direction represented by the arrow P2. Because of this, the movable body 50 tries to tilt in a direction represented by an arrow N2. Thus, the movable body 50 tries to tilt in the directions represented by the arrows N1 and N2, as a result of which the tilt in the direction represented by the arrow N1 and the tilt in the direction represented by the arrow N2 cancel each other, preventing the movable body 50 from tilting.

Figure 6:
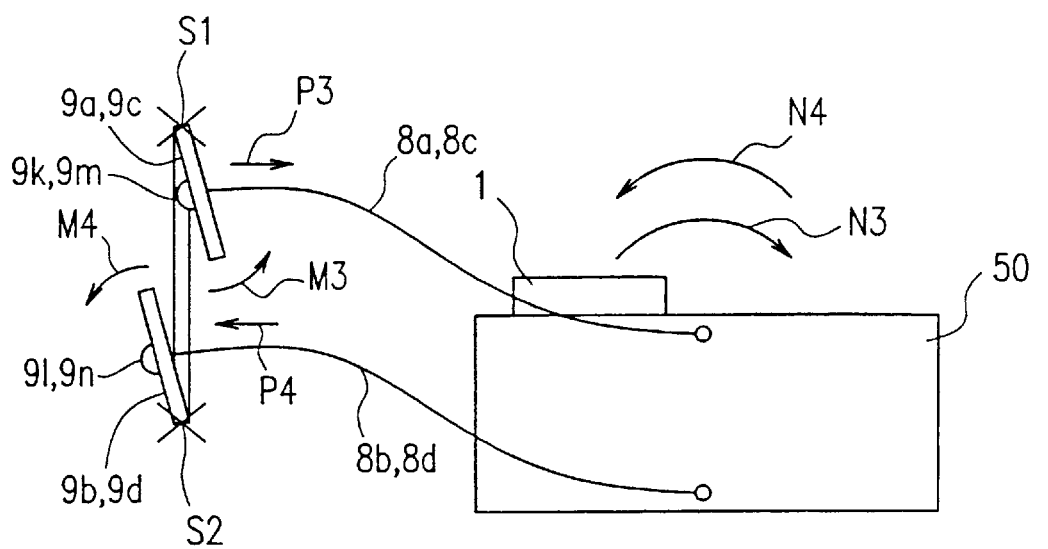
FIG. 6 is a side view schematically showing a state where the movable body in the apparatus for driving an objective lens shown in FIG. 1 is moved downward in the focusing direction F.

Similarly, in the case where the movable body 50 is moved downward in the focusing direction F from the initial position, as shown in FIG. 6, the movable body 50 tries to tilt in a direction represented by an arrow N3 along a movement path of an ellipse. In this case, the movable portions 9a and 9c of the metal supporting plate 9 pivot in a direction represented by an arrow M3 with respect to the pivot axis S1 by the force in a direction represented by an arrow P3, and the movable portions 9b and 9d pivot in a direction represented by an arrow M4 with respect to the pivot axis S2 by the force in a direction represented by an arrow P4. Thus, the movable body 50 also tries to tilt in the direction represented by an arrow N4, as a result of which the tilt in the direction represented by the arrow N3 and the tilt in the direction represented by the arrow N4 cancel each other, preventing the movable body 50 from tilting.

Furthermore, by optimizing a distance from junction points 9k and 9m of the movable portions 9a and 9c to the pivot axis S1 and a distance from junction portions 9l and 9n of the movable portions 9b and 9d to the pivot axis S2, or a spring constant of each of the twist deformation portions 9e to 9h, tilts in the directions represented by the arrows N1, N2, N3, and N4 can be completely canceled.

Figure 7:
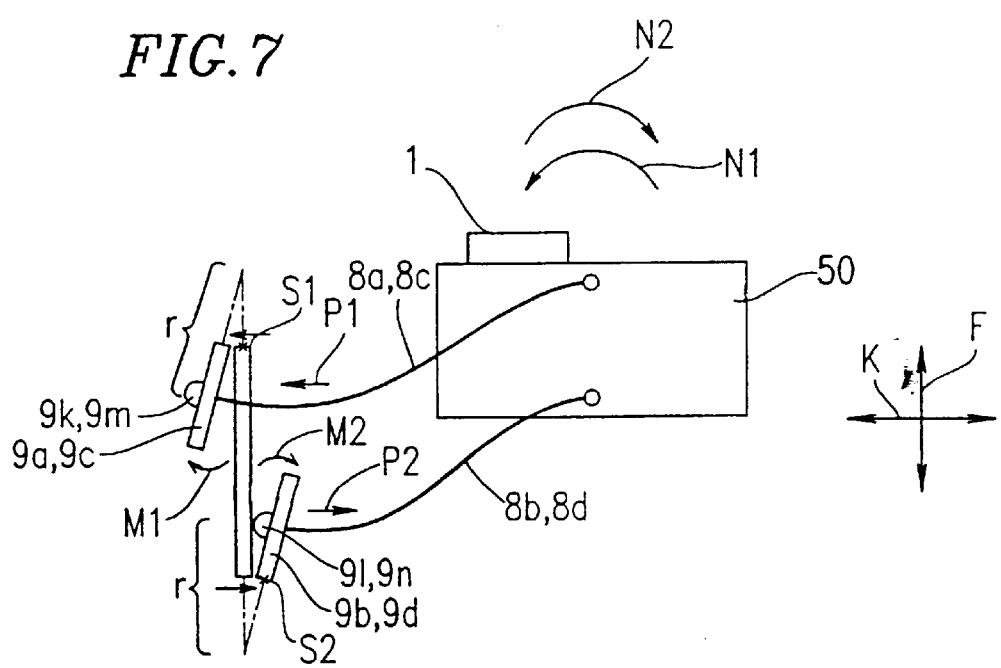
FIG. 7 is a side view showing a displacement state of a metal supporting plate in the apparatus for driving an objective lens shown in FIG. 1.

Furthermore, since each of the pivot axes S1 and S2 is not fixed to the holding member 10, when each of the movable portions 9a to 9d pivots around each of the pivot axes S1 and S2 as shown in FIG. 7, each of the pivot axes S1 and S2 is also displaced in the tangent direction K. Because of this, a substantial pivot radius r of the junction portions 9k to 9n of the movable portions 9a to 9d becomes larger than a distance from each of the junction points 9k and 9m to the pivot axis S1 and a distance from each of the junction points 9l and 9n to the pivot axis S2. Therefore, even in the case where each distance cannot be sufficiently ensured when the apparatus is attempted to be made thinner, the above-mentioned optimization for completely canceling the tilts in the directions represented by the arrows N1, N2, N3, and N4 becomes possible.

As described above, when the movable body 50 is moved in the focusing direction F, the tilt of the objective lens 1 is not increased. Furthermore, the tilt of the objective lens 1 is canceled at all times, preventing the tilt from occurring.

In Embodiment 1, a tilt is detected based on a jitter value. However, any method may be used, as long as a relative angle between the optical disk 16 and the optical axis J of the objective lens 1 can be detected. For example, a reflection type optical sensor may be provided in the movable body 50 for detecting a tilt. In this case, it is required that the optical sensor is supplied with power through each of the wires 8a to 8d and a wire for supplying power to the optical sensor is separately connected to the optical sensor. Furthermore, a reflection type optical sensor is provided on the base 51, and a light beam for recording and reproducing information may be received by the reflection type optical sensor. In this case, the same effect as that described above is obtained, and the apparatus can be made light-weight and simple.

Furthermore, the behavior of the apparatus for driving an objective lens, which changes due to the gravity, has not been described. However, in the apparatus for driving an objective lens of the present invention, the same effect can be obtained irrespective of the direction in which the gravity is applied.

In summary, in the apparatus for driving an objective lens in Embodiment 1, the first to fourth permanent magnets 3a to 3d are provided on the movable body 50, the first and second bobbins 5a and 5b are provided on the base 51, one end of each of the wires 8a to 8d supporting the movable body 50 is elastically and movably supported in the tangent direction K by the movable portions 9a to 9d of the metal supporting plate 9, and the viscoelastic material 11 for a metal supporting plate damps each of the movable portions 9a to 9d. The pivot axis S1 of the movable portions 9a and 9c and the pivot axis S2 of the movable portions 9b and 9d are disposed at respective positions in the focusing direction F outside each of the wires 8a and 8b or at respective positions in the focusing direction F outside each of the wires 8c and 8d. In such a structure, when the movable body 50 is moved in the focusing direction F, the tilt of the movable body 50 along a movement path of an ellipse and the tilt of the movable body 50 due to the pivot of each of the movable portions 9a to 9d of the metal supporting plate 9 cancel each other; as a result, the movable body 50 will not tilt.

By optimizing a distance from the junction points 9k and 9m to the pivot axis S1 and a distance from the junction portions 9l and 9n to the pivot axis S2, or a spring constant of each of the twist deformation portions 9e to 9h, tilts in the directions represented by the arrows N1, N2, N3, and N4 can be completely canceled.

Furthermore, in order to allow pivoting around an axis in the focusing direction F to be conducted more easily than pivoting around an axis in the tracking direction T, the bent portions 9i and 9j are formed at upper and lower portions of the metal supporting plate 9, respectively, and the twist deformation portions 9e to 9h are disposed on the bent portions 9i and 9j, respectively. This restriction of pivoting direction can efficiently cancel the tilt of the movable body 50 along a movement path of an ellipse.

Furthermore, since each of the pivot axes S1 and S2 is not fixed to the holding member 10, when each of the twist deformation portions 9e to 9h is twisted, and each of the junction points 9k to 9n pivots around each of the pivot axes S1 and S2, each of the pivot axes S1 and S2 is displaced in the tangent direction K. Because of this, a substantial pivot radius r of the junction portions 9k to 9n of the movable portions 9a to 9d becomes larger than a distance from each of the junction points 9k and 9m to the pivot axis S1 and a distance from each of the junction points 9l and 9n to the pivot axis S2. Therefore, even in the case where each distance cannot be sufficiently ensured when the apparatus is attempted to be made thinner, the above-mentioned optimization for completely canceling the tilts in the directions represented by the arrows N1, N2, N3, and N4 becomes possible.

Furthermore, the first to fourth permanent magnets 3a to 3d are provided on the side of the movable body 50, and electromagnets are not disposed on the side of the movable body 50. Therefore, power is not required to be supplied for driving electromagnets through each of the wires 8a to 8d, and each of the wires 8a to 8d is not required to be electrically insulated. Therefore, the metal supporting plate 9 can be made of metal, and can have an optimum structure for suppressing resonance of each of the wires 8a to 8d. Furthermore, since the shape and assembly of components such as the wires 8a to 8d and the metal supporting plate 9 are simple, damage of components or bending of the wires 8a to 8d during assembly is not likely to occur, enabling assembly to be conducted easily.

Furthermore, in Embodiment 1, the base 51 is composed of the metal supporting plate 9, the holding member 10, and the stationary section 12 made of metal, and the holding member 10 is integrated with the metal supporting plate 9 and the stationary section 12 when the holding member 10 is subject to insert molding. Therefore, compared with the case where the metal supporting plate 9, the holding member 10, and the stationary section 12 are integrated with an adhesive or the like, variation in characteristics due to non-uniformity of a coated amount of the adhesive is eliminated, and the number of steps can be made smaller than the case of integrating those components with an adhesive or the like.

A prototype of the apparatus for driving an objective lens in Embodiment 1 was actually produced. The movable body 50 was moved in the focusing direction F with a displacement amount of±0.6 mm, and the tilt of the objective lens 1 around an axis in the tracking direction T was evaluated to be at most about 0.03°. Comparing the result of 0.03° in Embodiment 1 with the result of 0.12° in a conventional apparatus for driving an objective lens, it was confirmed that a tilt of the objective lens was substantially decreased.

Embodiment 2

Figure 8:
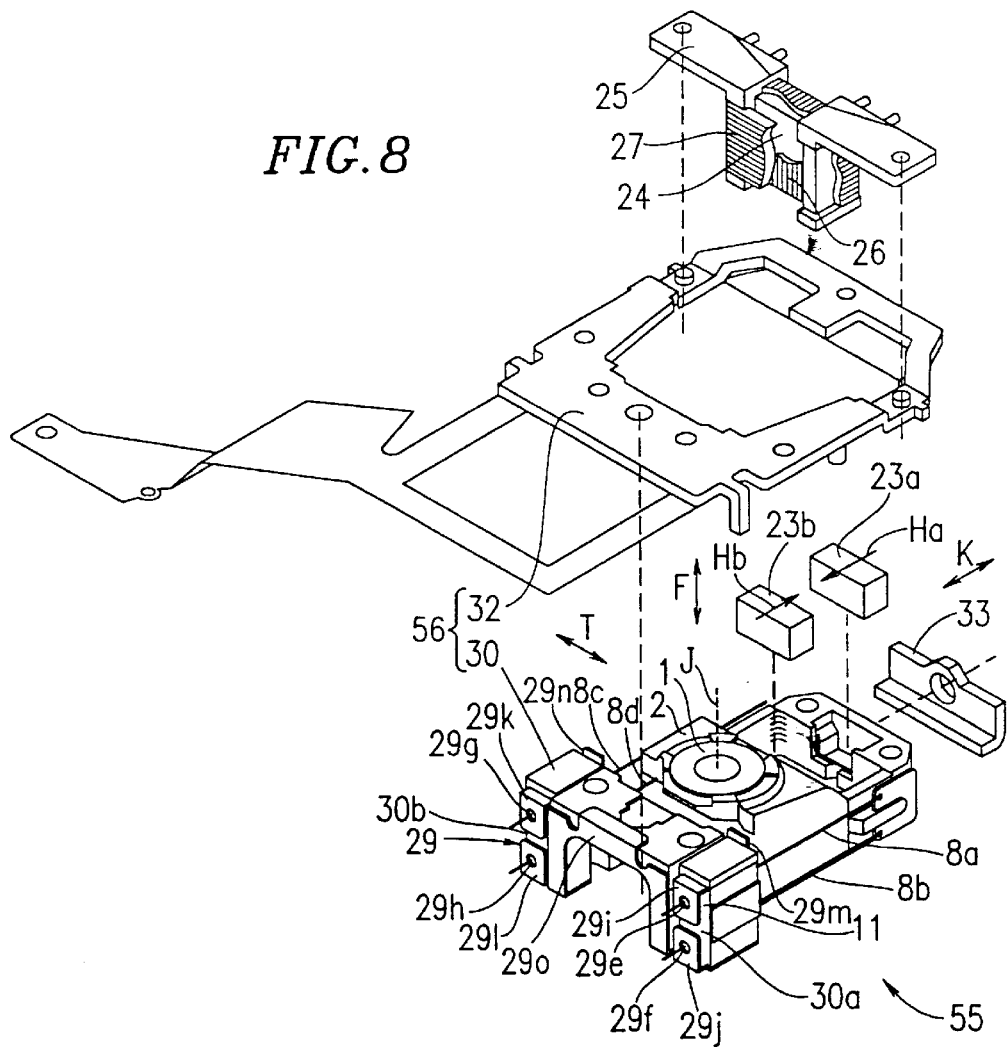
FIG. 8 is an exploded perspective view of an apparatus for driving an objective lens in Embodiment 2 of the present invention.

FIG. 8 is an exploded perspective view of an apparatus for driving an objective lens in Embodiment 2 of the present invention. In this figure, the components which function in the same way as those in FIGS. 1 and 2 are denoted by the same reference numerals as those therein.

Figure 9:
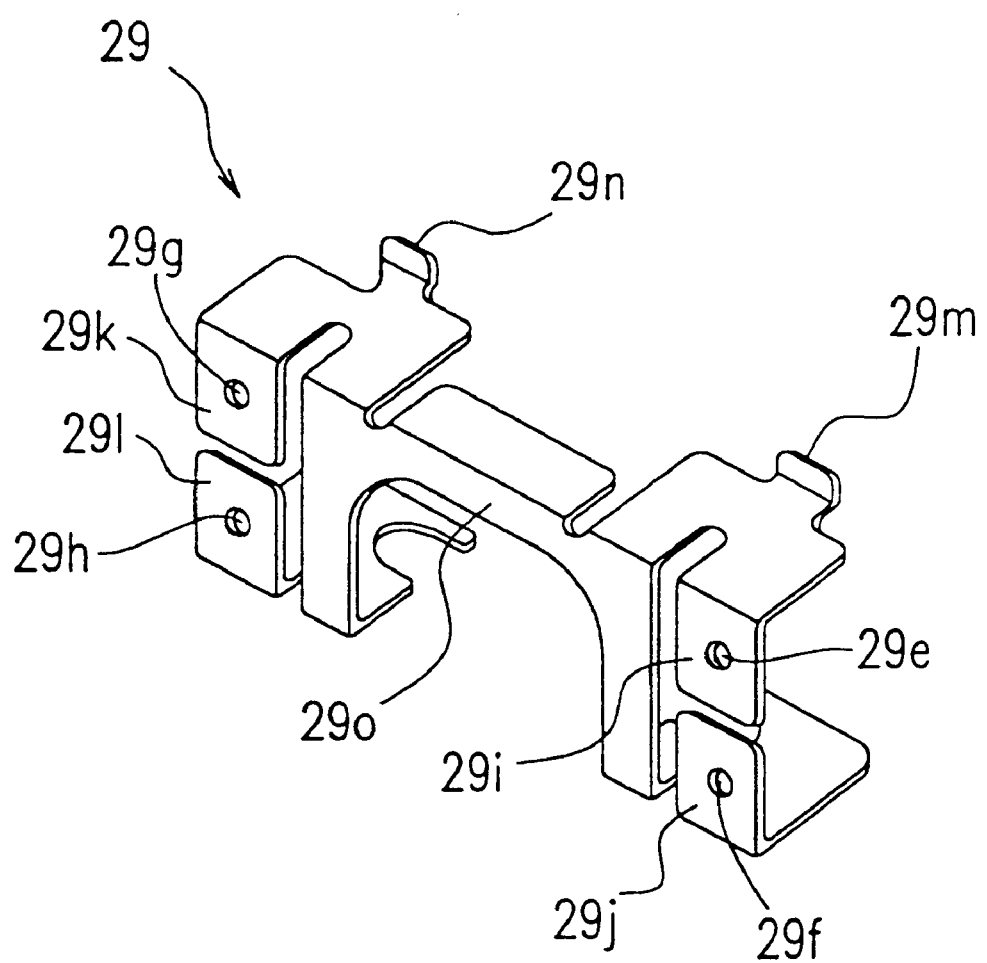
FIG. 9 is a perspective view showing a plated metal supporting plate in the apparatus for driving an objective lens shown in FIG. 8.

In the apparatus for driving an objective lens in Embodiment 2, a metal supporting plate (elastic supporting plate) 29 shown in FIG. 9 is used in place of the metal supporting plate 9 shown in FIGS. 1 and 2. In the metal supporting plate 29, the entire back surface of each of the movable portions 29i to 29l is plated with Ni. Furthermore, the metal supporting plate 29 is integrated with a holding member 30 by insert molding, and each of solder anchoring portions 29m to 29o of the metal supporting plate 29 is soldered to a stationary section 32, whereby the holding member 30 is fixed to the stationary section 32. Thus, an assembly structure of the metal supporting plate 29, the holding member 30, and the stationary section 32 is different from that in Embodiment 1.

In Embodiment 1, the permanent magnets 3a to 3d, the opposing yokes 4a and 4b, the bobbins 5a and 5b, the tracking coils 6a and 6b, and the focusing coils 7a and 7b are disposed so as to be symmetric with respect to the symmetric plane 82. However, in Embodiment 2, a pair of permanent magnets 23a and 23b, one opposing yoke 24, one bobbin 25, one tracking coil 26, and one focusing coil 27 are disposed. Furthermore, in Embodiment 1, the movable body 50 is moved in the focusing direction F, the tracking direction T, and the tilt direction R, whereas in Embodiment 2, a movable body 55 is movable only in the focusing direction F and the tracking direction T.

Under the condition that the holding member 30, the stationary section 32, and the metal supporting plate 29 are integrated, the bobbin 25 is positioned between the permanent magnets 23a and 23b. Each of movable portions 29i to 29l is disposed on each of stepped concave portions 30a and 30b of the holding member 30, whereby an area for each of the movable portions 29i to 29l to move is kept. A viscoelastic material which contacts each of the movable portions 29i to 29l and a viscoelastic material which contacts each of wires 8a to 8d are not shown. A counterweight 33 is provided on the lens holder 2. A base 56 is composed of the holding member 30 and the stationary section 32.

The plated metal supporting plate 29 is obtained by plating one side of an elastic metal material such as SUS, phosphor bronze, and beryllium copper with Ni, cutting out the metal material, and molding it by press working so that one side of the material plated with Ni faces inside. Herein, one side of the elastic metal material may be plated with metal which has poor solder wettability instead of Ni.

In Embodiment 2, the inside surface of the metal supporting plate 29 is plated with Ni. Therefore, when each of the wires 8a to 8d is soldered to the metal supporting plate 29, solder will not flow from the front surface of each of the movable portions 29i to 29l to the back surface thereof via each of holes 29e to 29h.

If solder flows from the front surface of each of the movable portions 29i to 29l to the back surface thereof via each of the holes 29e to 29h, solder adheres to each of the wires 8a to 8d on the back surface, and portions of the wires 8a to 8d to which solder adheres will not be elastically deformed; as a result, portions of the wires 8a to 8d which are elastically deformable become short.

In Embodiment 2, solder does not flow from the front surface of each of the movable portions 29i to 29l to the back surface thereof via each of the holes 29e to 29h. Therefore, the portions of the wires 8a to 8d which are elastically deformable do not become short. Thus, characteristics such as a resonance frequency determined by the metal supporting plate 29 and each of the wires 8a to 8d and an attenuation factor of a resonance suppressing effect by the metal supporting plate 29 are stabilized, and a tilt which occurs due to the variation in a mechanism supporting the movable body 55 can be suppressed.

As long as the surface treatment of the metal supporting plate 29 is conducted in such a manner that there will be a difference in solder wettability between the front surface and the back surface of each of the movable portions 29i to 29l, the same effect can be obtained. Thus, only the surface of each of the movable portions 29i to 29l may be plated with, for example, Au which has satisfactory solder wettability. Furthermore, even when the front surface of each of the movable portions 29i to 29l is plated with metal having satisfactory solder wettability, and the back surface thereof is plated with metal having unsatisfactory solder wettability, the same effect can be obtained.

Furthermore, each of the solder anchoring portions 29m to 29o is soldered to the stationary section 32, whereby the holding member 30 is fixed to the stationary section 32. In the case where soldering is utilized for fixing the holding member 30, a coefficient of thermal expansion of solder is very small; therefore, even when the ambient temperature rises, changes in a tilt of an objective lens can be suppressed, and an anti-shock property is improved. Furthermore, since each of the solder anchoring portions 29m to 29o is a part of the metal supporting plate 29, the number of components is not increased.

Embodiment 3

Figure 10:
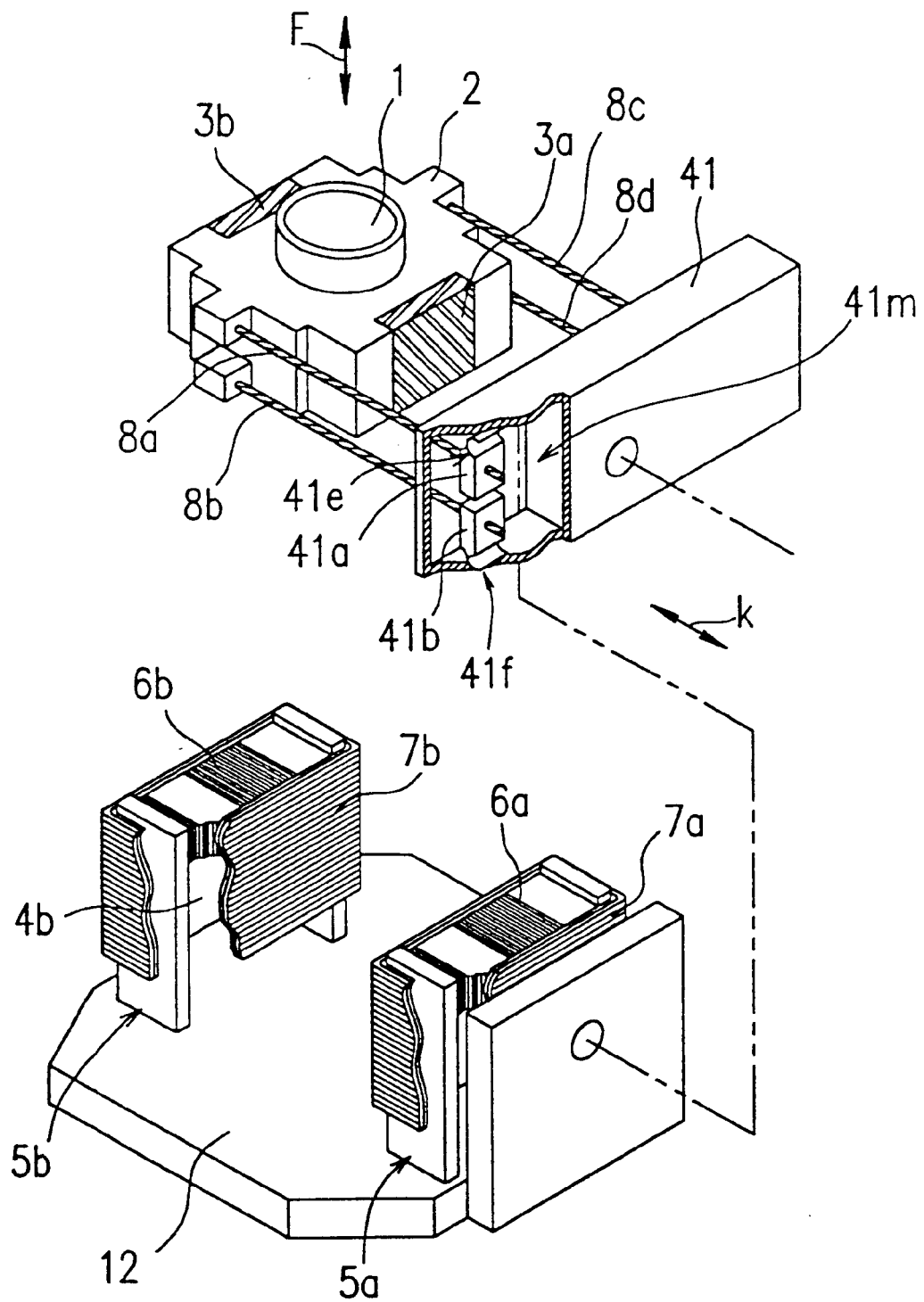
FIG. 10 is an exploded perspective view showing an apparatus for driving an objective lens in Embodiment 3 of the present invention.
Figure 11:
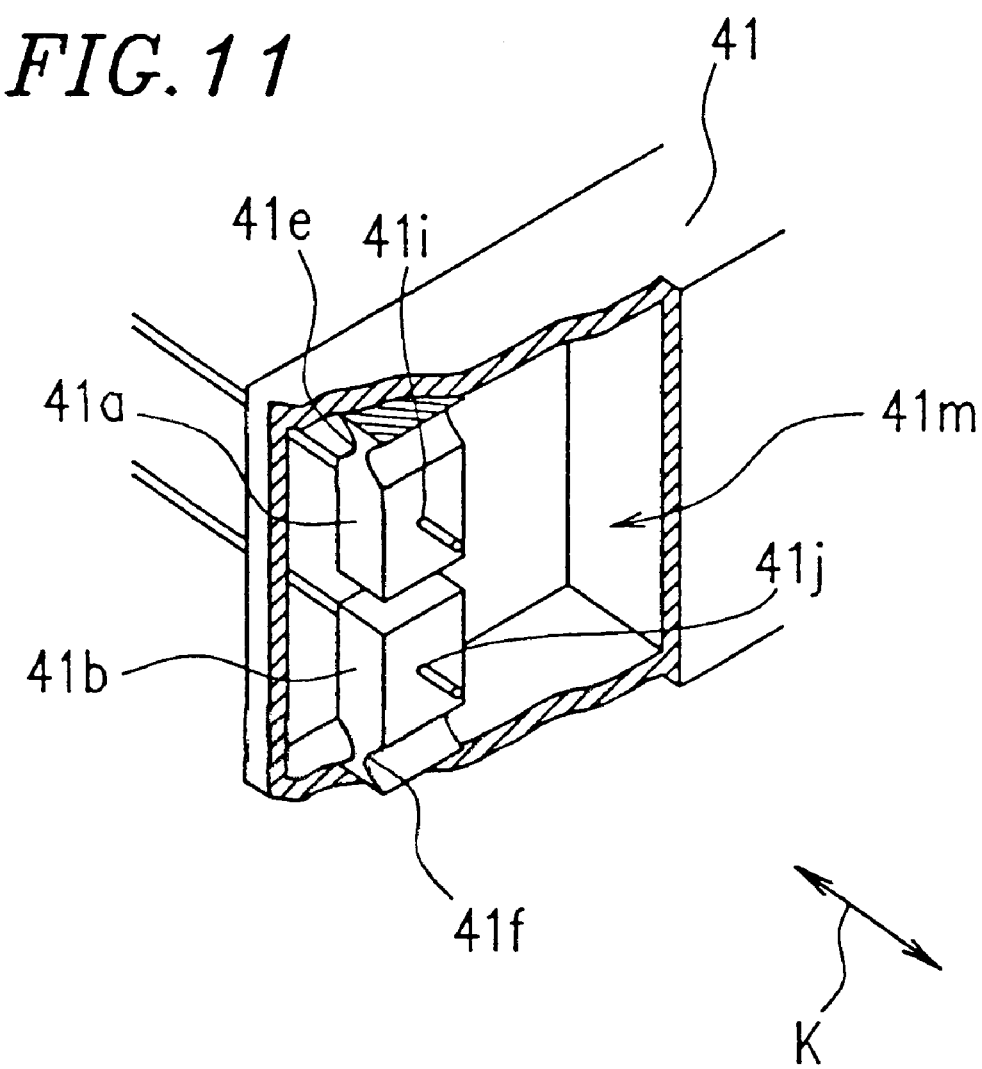
FIG. 11 is a partially enlarged view showing an enlarged supporting plate made of resin in the apparatus for driving an objective lens shown in FIG. 10.
Figure 12:
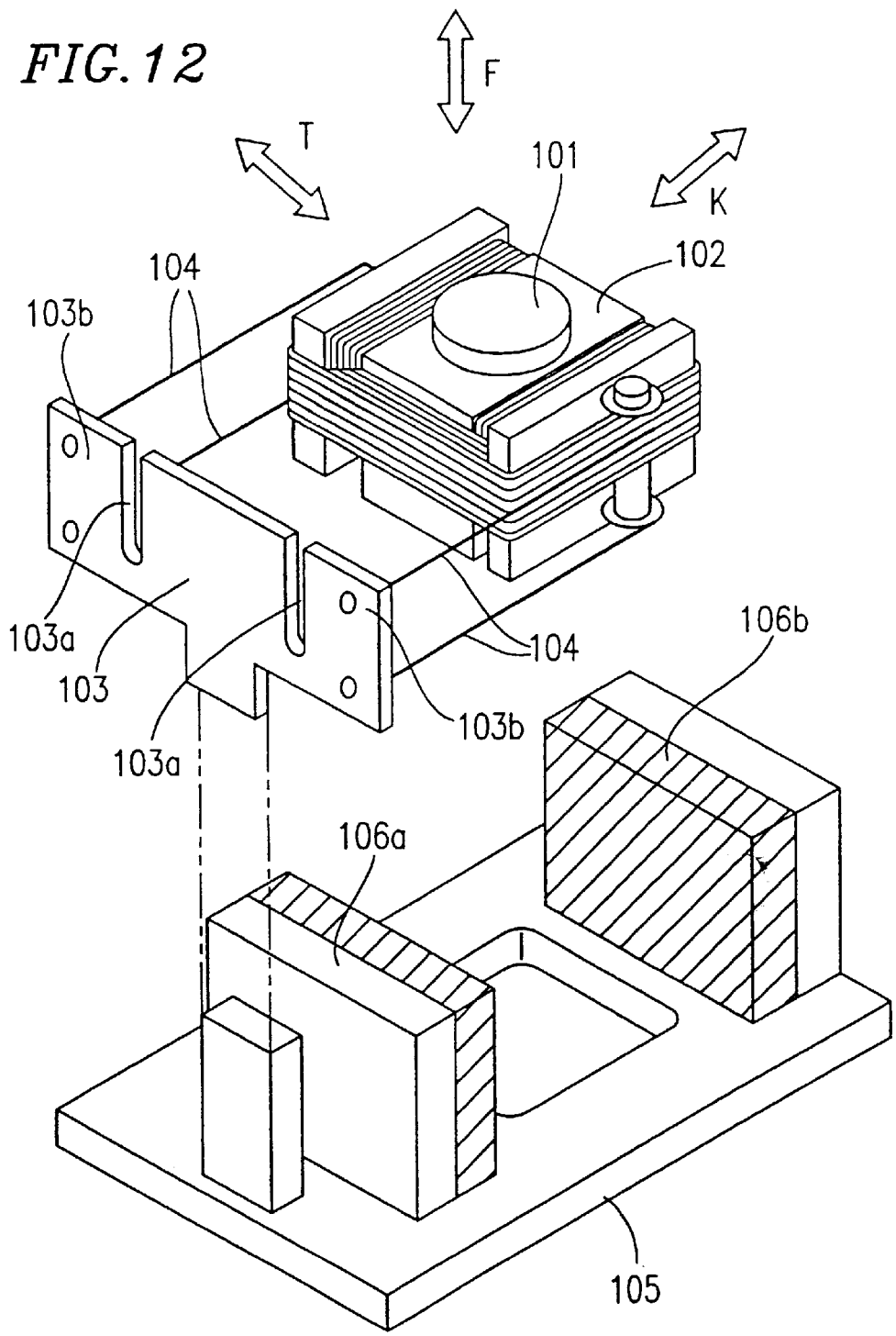
FIG. 12 is an exploded perspective view showing a conventional apparatus for driving an objective lens.
Figure 13:
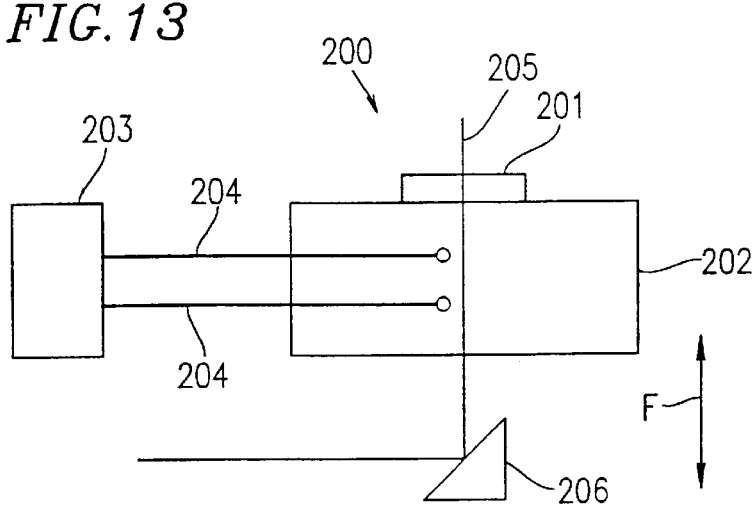
FIG. 13 is a side view showing a basic structure of a conventional apparatus for driving an objective lens.
Figure 14:
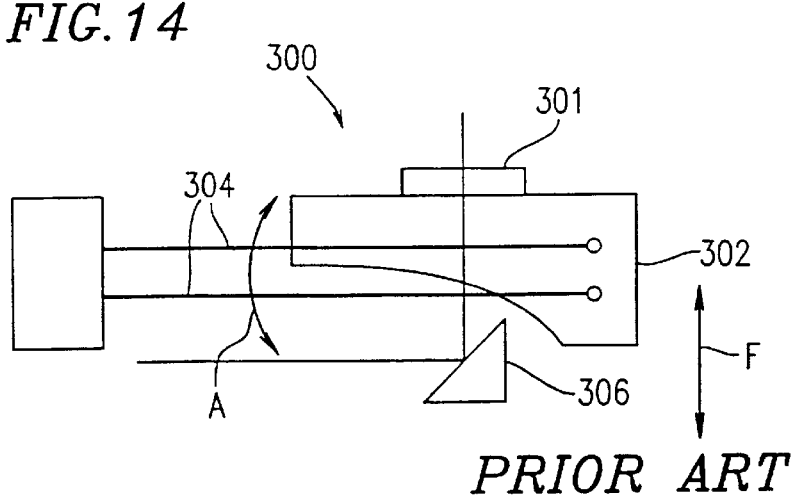
FIG. 14 is a side view showing a basic structure of another conventional apparatus for driving an objective lens.
Figure 15:
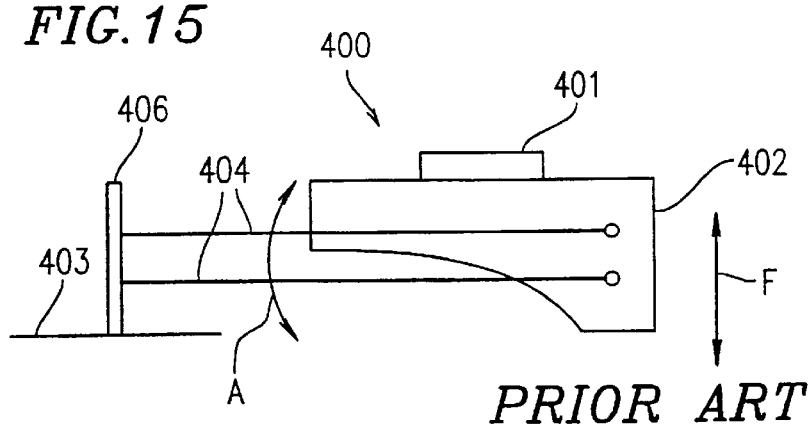
FIG. 15 is a side view showing a basic structure of still another conventional apparatus for driving an objective lens.
Figure 16:
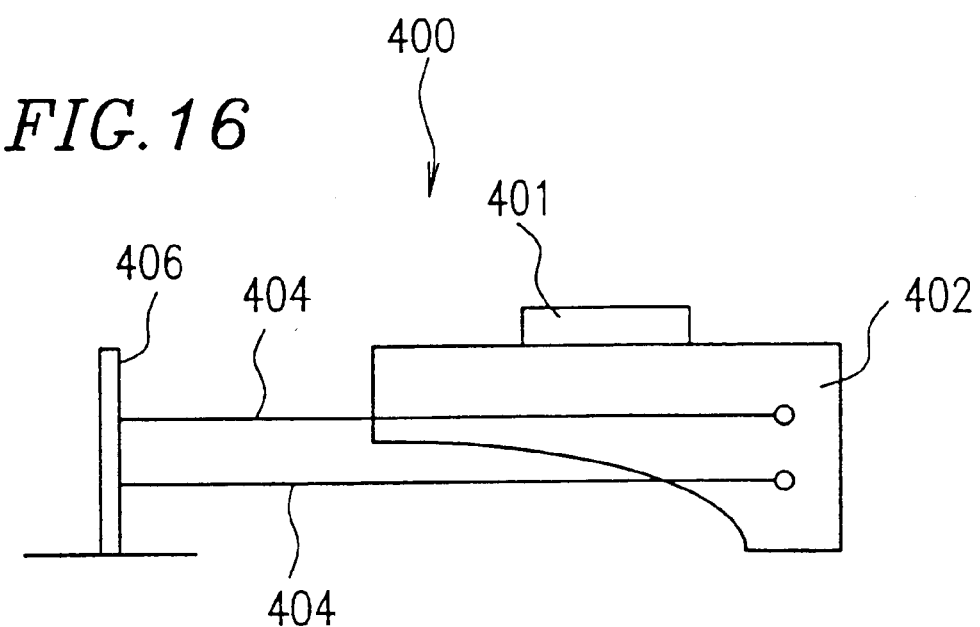
FIG. 16 is a side view schematically showing a state where a lens holder in the apparatus for driving an objective lens shown in FIG. 15 is at an initial position.
Figure 16:
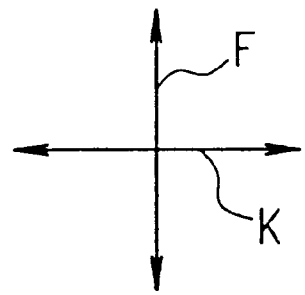
Figure 17:
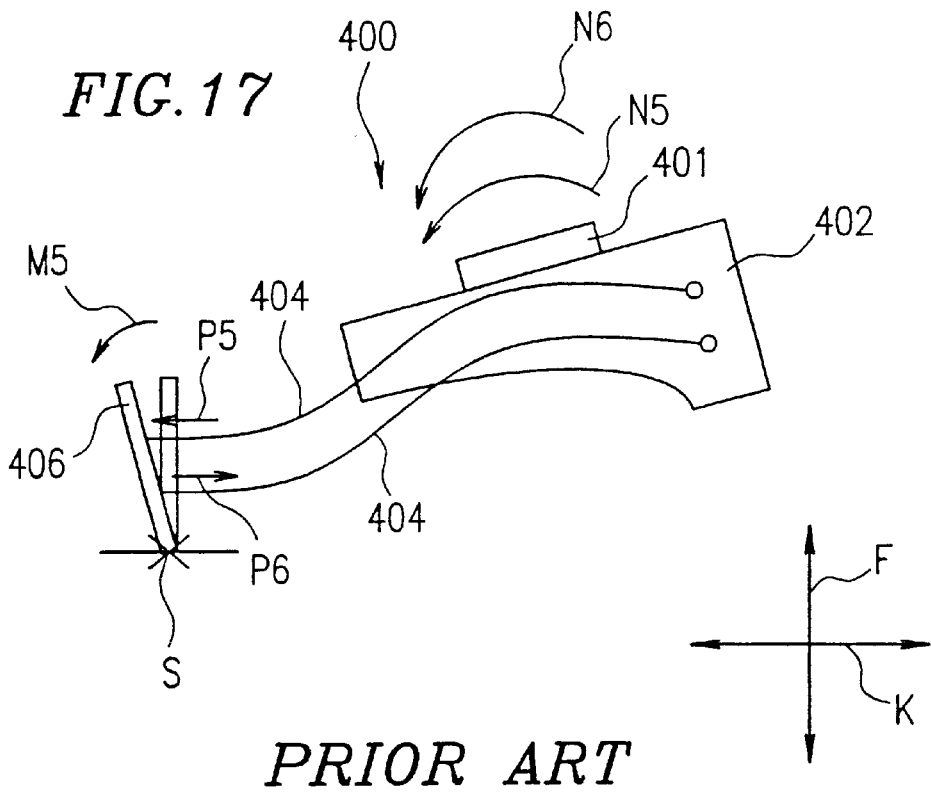
FIG. 17 is a side view schematically showing a state where a lens holder in the apparatus for driving an objective lens shown in FIG. 15 is moved upward in a focusing direction F.
Figure 18:
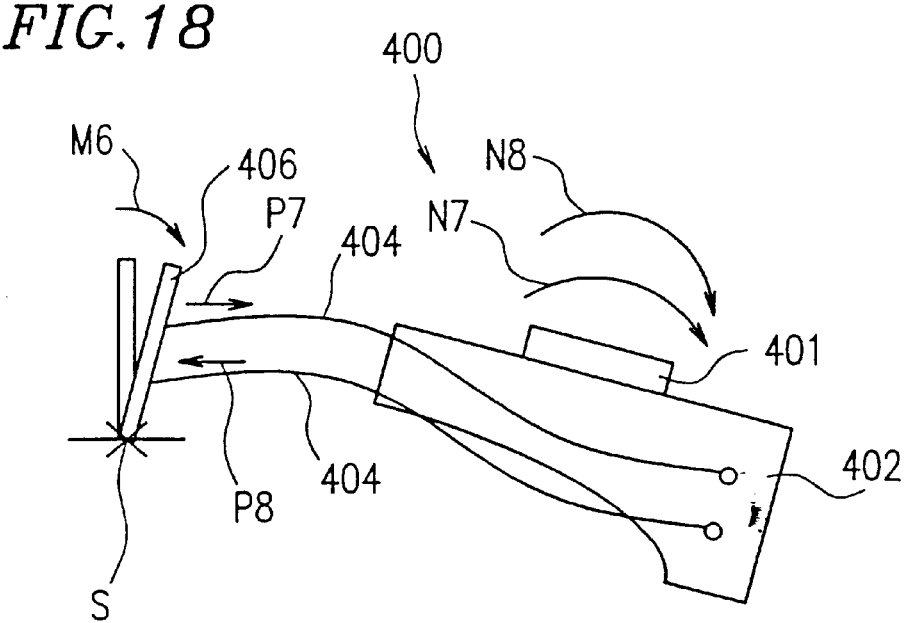
FIG. 18 is a side view schematically showing a state where a lens holder in the apparatus for driving an objective lens shown in FIG. 15 is moved downward in the focusing direction F.
Figure 18:
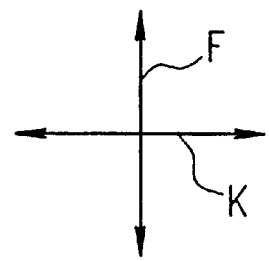

FIG. 10 is an exploded perspective view showing an apparatus for driving an objective lens in Embodiment 3 of the present invention. FIG. 11 is a partially enlarged view showing each of movable portions 41a and 41b of a supporting plate (elastic supporting plate) 41 made of resin in the apparatus for driving an objective lens in Embodiment 3. In FIGS. 10 and 11, the components which function in the same way as those in FIGS. 1 and 2 are denoted with the same reference numerals as those in FIGS. 1 and 2.

In the apparatus for driving an objective lens in Embodiment 3, the supporting plate 41 made of resin is utilized in place of the metal supporting plate 9 in FIGS. 1 and 2. The supporting plate 41 made of resin includes movable portions 41a to 41d (41c and 41d are not shown), and molded by insert molding of synthetic resin. During molding, one end of each of the wires 8a to 8d is buried into each of the movable portions 41a to 41d, and one end of each of the wires 8a to 8d is integrated with each of the movable portions 41a to 41d.

Each of the movable portions 41a to 41d is connected to the supporting plate 41 made of resin via each of hinge portions 41e to 41h (41g and 41h are not shown). Each of the movable portions 41a to 41d is moved independently in the tangent direction K with respect to pivot axes (i.e., hinge portions 41e to 41h). Each of the hinge portions 41e to 41h is made of a very thin synthetic resin so as to function as a hinge. Alternatively, a thin plate made of an elastic metal material such as SUS, phosphor bronze, and beryllium copper is buried into each of the hinge portions 41e to 41h by insert molding, whereby a hinge function may be obtained. A viscoelastic material (not shown) for damping each of the movable portions 41a to 41d is accommodated in a viscoelastic material accommodating portion 41m.

The supporting plate 41 made of resin is fixed to the stationary section 12, the lens holder 2 is disposed between the first bobbin 5a and the second bobbin 5b, and the lens holder 2 is movably supported by each of the wires 8a to 8d.

In the apparatus for driving an objective lens in Embodiment 3, the same effect as that in Embodiment 1 is obtained, and each of the wires 8a to 8d is molded so as to be integrated with the supporting plate 41 made of resin, so that an assembly property is improved. Furthermore, it is not required that land portions or the like for soldering each of the wires 8a to 8d is provided on the supporting plate. Therefore, each of the hinge portions 41e to 41h can be disposed close to each of junction points 41i to 41l (41k and 41l are not shown). This enables each of the wires 8a to 8d to approach each other in the focusing direction F, which realizes a thinner apparatus. Furthermore, since each of the wires 8a to 8d is integrated with each of the movable portions 41a to 41d by insert molding, it becomes easy to exactly set a correlative position of each of the wires 8a to 8d. As a result, a tilt caused by the variation in a mechanism supporting the lens holder 2 can be suppressed.

As described above, according to the present invention, in the case where a lens holder is moved in a vertical direction, a tilt of the lens holder along a movement path can be canceled by a tilt of each movable portion. By optimizing a distance between a supporting point at one end of each elastic arm and a pivot center of each movable portion, and a spring constant related to elastic pivoting of each movable portion, a tilt of the lens holder can be completely canceled. Thus, even when the lens holder is moved in the vertical direction, an objective lens will not tilt, and an optical aberration on an optical disk is suppressed, making it possible to exactly record and reproduce information with respect to the optical disk.

In one embodiment, since a damping member for suppressing vibration of each movable portion is provided, resonance of each elastic arm can be suppressed.

In one embodiment, since an elastic plate is bent, and each movable portion is supported so as to be elastically pivotable around each corner of the bent elastic plate, each movable portion moves around an axis in a radius direction of the optical disk more easily than around an axis in the vertical direction. This enables a tilt of the lens holder along a movement path to be efficiently canceled.

In one embodiment, since the above-mentioned respective axis is elastically movable in the tangent direction of the optical disk, a substantial pivot radius of a supporting point at one end of each elastic arm becomes large. This enhances design flexibility of an elastic plate, making it possible to miniaturize the elastic plate to obtain a thinner apparatus.

In one embodiment, each elastic arm is in the shape of a bar.

In one embodiment, since a resinous holding portion is molded to be integrated with the elastic plate and a stationary section, an assembly process can be simplified, and variation in characteristics of an apparatus can be eliminated.

In one embodiment, each elastic arm is made of metal and soldered to each movable portion of the elastic plate, and a back surface of each movable portion to which each elastic arm is connected is surface-treated for the purpose of decreasing solder wettability.

In one embodiment, a surface treatment for decreasing solder wettability is Ni-plating.

In one embodiment, each elastic arm is made of metal and soldered to each movable portion of the elastic plate, and each movable portion of the elastic plate to which each elastic arm is connected is surface-treated for the purpose of increasing solder wettability.

In one embodiment, a surface treatment for increasing solder wettability is Au-plating.

The above-mentioned surface treatment can prevent solder from flowing from a surface for soldering to a reverse surface thereof. Because of this, characteristics of each elastic arm are not changed due to flow of solder, and characteristics of a resonance frequency determined by the elastic plate and each elastic arm and an attenuation factor of a resonance suppressing effect of the elastic plate are stabilized. Furthermore, a tilt caused by variation in a mechanism supporting the lens holder can be suppressed.

In one embodiment, the holding portion is integrated with the elastic plate by molding, and the elastic plate is soldered to the stationary section. Since a coefficient of thermal expansion of solder is very small, even when the ambient temperature rises, changes in a tilt of an objective lens can be suppressed.

In one embodiment, each movable portion of a base is made of a synthetic resin integrally molded with at least part of the base. Therefore, an assembly process can be simplified, and variation in characteristics of an apparatus can be eliminated. Furthermore, compared with soldering, it is not required that land portions or the like for soldering be provided, so that each movable portion can be miniaturized, and each elastic arm can be placed close to each other in the vertical direction. Therefore, an apparatus can be made thinner.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An apparatus for driving an objective lens, comprising:
   a base which is moved along an optical disk;
   an objective lens disposed so as to be opposed to the optical disk and having an optical axis in a vertical direction with respect to the optical disk, for optically recording information onto the optical disk or optically reproducing information from the optical disk;
   a holder portion for holding the objective lens;
   a plurality of elastic arms extending between the base and the holder portion in a tangent direction of the optical disk, for supporting the holder portion moveably with respect to the base; and
   a driving portion for generating an electromagnetic force for moving the holder portion with respect to the base, wherein the plurality of elastic arms are disposed away from each other in the vertical direction, the base includes a plurality of moveable portions for supporting, respectively, one end of each of the elastic arms, and each of the movable portions is supported at each position in a vertical direction outside of one end of each of the elastic arms, so as to be elastically pivotable around each axis in a radius direction of the optical disk.

2. An apparatus for driving an objective lens according to claim 1, wherein each of the movable portions of the base includes a damping member for suppressing vibration of each of the movable portions.

3. An apparatus for driving an objective lens according to claim 1, wherein the base includes an elastic plate, the elastic plate including bent portions at each position in a vertical direction outside of one end of each of the elastic arms so as to form the upper and lower portions of the base, and each of the movable portions of the base is supported so as to be elastically pivotable around each corner of a bent portion of the elastic plate.

4. An apparatus for driving an objective lens according to claim 1, wherein each axis of the movable portions in a radius direction of the optical disk is elastically movable in a tangent direction of the optical disk.

5. An apparatus for driving an objective lens according to claim 1, wherein each of the elastic arms is in the shape of a bar.

6. An apparatus for driving an objective lens according to claim 1, wherein the base includes an elastic plate made of metal having each of the movable portions of the base, a stationary section made of metal, and a resinous holding portion for holding the elastic plate, and the holding portion is integrated with the elastic plate and the stationary section by a mold.

7. An apparatus for driving an objective lens according to claim 1, wherein the base includes an elastic plate made of metal having each of the movable portions of the base, each of the elastic arms is made of metal and connected to each of the movable portions of the elastic plate by a solder, and a reverse surface of each of the movable portions of the elastic plate to which each of the elastic arms is connected includes a surface treatment which decreases wettability of the solder.

8. An apparatus for driving an objective lens according to claim 7, wherein the surface treatment is Ni-plating.

9. An apparatus for driving an objective lens according to claim 1, wherein the base includes an elastic plate made of metal having each of the movable portions of the base, each of the elastic arms is made of metal and connected to each of the movable portions of the elastic plate by a solder, and each of the movable portions of the elastic plate to which each of the elastic arms is connected includes a surface treatment which decreases wettability of the solder.

10. An apparatus for driving an objective lens according to claim 9, wherein the surface treatment is Au-plating.

11. An apparatus for driving an objective lens according to claim 1, wherein the base includes an elastic plate made of metal having each of the movable portions of the base, a stationary section made of metal, and a resinous holding portion for holding the elastic plate, the holding portion is integrated with the elastic plate by a mold, and the elastic plate is soldered to the stationary section.

12. An apparatus for driving an objective lens according to claim 1, wherein each of the movable portions of the base is made of synthetic resin which is integrally molded with at least part of the base.

* * * * *

UNITED STATES PATENT AND TRADEMARK OFFICE
CERTIFICATE OF CORRECTION

PATENT NO.    : 6,747,921 B2     Page 1 of 1
DATED         : June 8, 2004
INVENTOR(S)   : Kanji Wakabayashi et al.

It is certified that error appears in the above-identified patent and that said Letters Patent is hereby corrected as shown below:

Title page,
Item [75], Inventors, should read as follows: -- Hitoshi Fuji, Osaka, Japan; Hiroshi Yamamoto, Kyoto, Japan; Masanari Mohri, Hyogo-Ken, Japan; and Kenichiro Urairi, Kyoto, Japan. --`

Signed and Sealed this

Seventeenth Day of August, 2004

JON W. DUDAS
*Acting Director of the United States Patent and Trademark Office*